United States Patent [19]

Kurzweil et al.

[11] 3,952,856
[45] Apr. 27, 1976

[54] APPARATUS FOR REGULATING ARTICLE-TREATING MACHINES THAT MAINTAIN AN ACCUMULATION OF ARTICLES AT AN INLET END

[75] Inventors: Lubor Kurzweil, Kondringen-Landeck; Joachim Linde, Leiselheim, both of Germany

[73] Assignee: Firma Otto Sick KG, Metallwarenfabrik, Mundingen (Baden), Germany

[22] Filed: Aug. 16, 1974

[21] Appl. No.: 498,251

[30] Foreign Application Priority Data
Aug. 21, 1973 Germany............................ 2342252

[52] U.S. Cl................................... 198/37; 198/213; 198/104
[51] Int. Cl.²......................................... B65G 43/08
[58] Field of Search ............... 198/34, 19, 34 A, 37, 198/213, 104; 221/9, 10, 13; 222/55, 413

[56] References Cited
UNITED STATES PATENTS

| | | |
|---|---|---|
| 2,730,226 | 1/1956 | Day et al. .......................... 198/34 A |
| 3,036,624 | 5/1967 | Carter................................. 198/34 A |
| 3,338,472 | 8/1967 | Gardner................................ 222/55 |
| 3,756,434 | 9/1973 | Teske..................................... 222/55 |

*Primary Examiner*—Robert J. Spar
*Assistant Examiner*—James M. Slattery
*Attorney, Agent, or Firm*—Burns, Doane, Swecker & Mathis

[57] ABSTRACT

A machine for treating articles, such as containers, for example, includes an infeed worm conveyor to receive a continuous flow of containers. The speed of machine operation is regulated by a speed control mechanism so as to maintain a desired constant length accumulation of containers ahead of the infeed worm conveyor. The infeed worm conveyor is axially shiftable, under the influence of forces created by accumulated containers, to transmit such forces to the speed control mechanism as an indication of the size of container accumulation.

3 Claims, 1 Drawing Figure

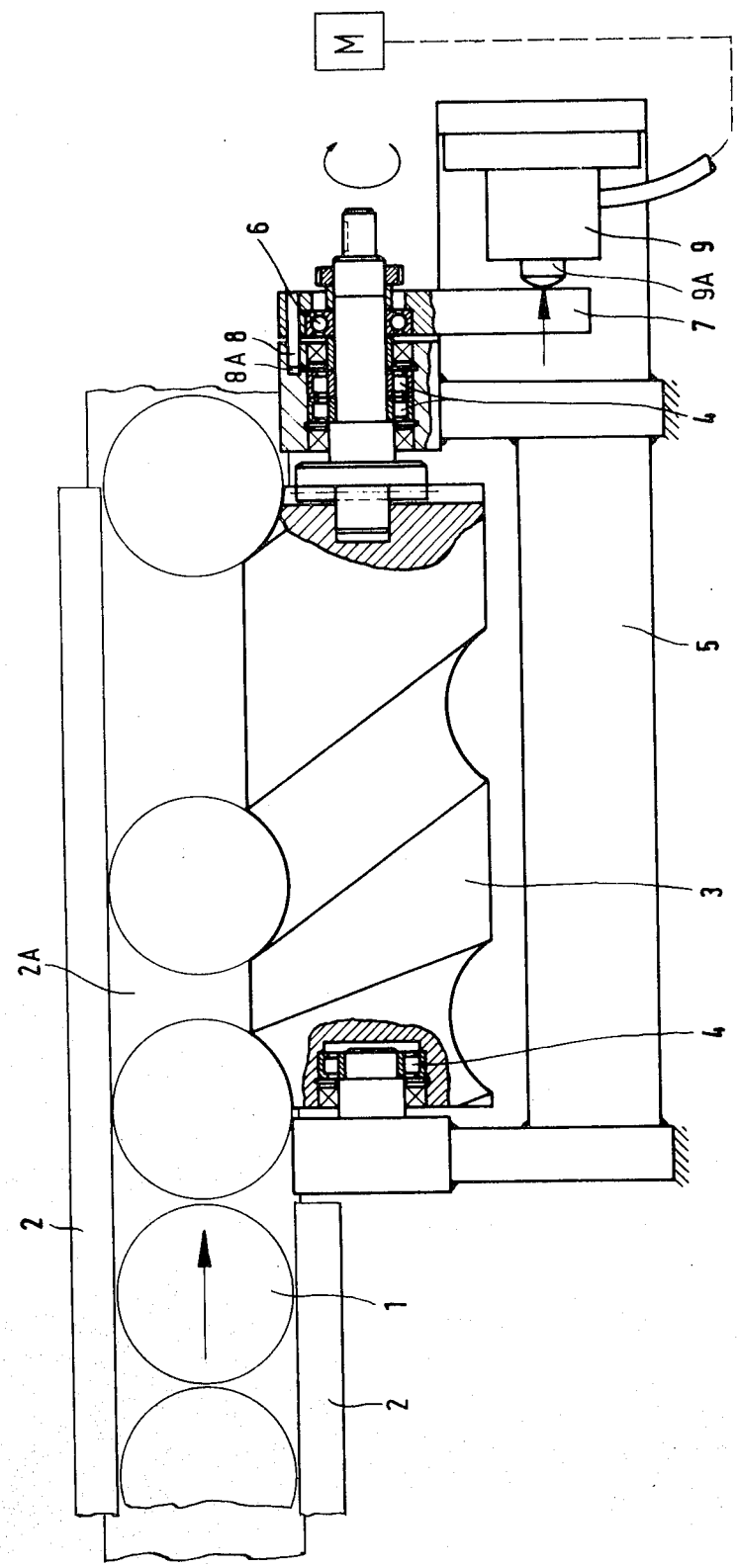

APPARATUS FOR REGULATING ARTICLE-TREATING MACHINES THAT MAINTAIN AN ACCUMULATION OF ARTICLES AT AN INLET END

BACKGROUND AND OBJECTS OF THE INVENTION

The present invention relates to the conveying of articles to a machine in which it is desired to maintain the build-up of articles ahead of the machine at approximately constant length. More particularly, this invention concerns a regulator system used in conjunction with machines that are being continuously supplied with containers, such as bottles or the like, by a conveyor, for regulating the rate of machine operation in response to the magnitude of container accumulation at the machine inlet.

In the case of machines which handle containers, such as by filling, sealing, capsuling, and/or labeling the containers for example, it is necessary to adapt the speed of machine operation in order to establish sufficiently high capacity, dependent of course on which type of container is being filled. On the other hand, reliability of machine operation often requires at least some degree of container accumulation at the machine inlet so that containers are continuously available for treatment. Both of these problems could be solved through a special system regulating the speed of the machine to establish high capacity, while being capable of subjecting the machine to a change of conveyor flow (i.e. container feeding), thereby influencing the corresponding container accumulation.

Up to now there has been utilized an unstable two-point regulation wherein control elements of digital operation are installed ahead of the machine. These control elements can be located either on the conveyor, or on a transversal guide in the case of a multiple-laned conveyor. Signals emanate from the control elements to regulate machine speed. This method of regulation generally results in the speed drive being operated often. Over-charge conditions may occur, with container accumulation taking up relatively long sections of the transport chains.

It is an object of the present invention to eliminate or minimize such problems.

Another object of the present invention is to regulate the operating speed of an article-handling machine in accordance with forces produced by accumulated articles, such as containers that are being fed to the machine.

Another object of this invention is to change the machine operating speed in response to changes in the size of article accumulation so that variation of the operating speed maintains the accumulation at nearly a constant level.

A further object is to enable such maintained level of accumulation to be easily adjusted.

SUMMARY OF A PREFERRED EMBODIMENT OF THE INVENTION

At least some of these objects are accomplished in article-handling machines, such as container-treating machines to which a continuous flow of containers is supplied. Power which is produced through the accumulation of containers acts upon the infeed mechanisms of the machine. This power is transmitted to a speed control means which includes an index converter. This index converter delivers the corresponding actual rating to a speed control device which compares this effective result with a theoretical value. The balance of the effective and desired values controls the speed control device to control the machine speed drive, until the container accumulation corresponds to the desired value.

The infeed conveyor preferably includes an infeed-worm for conveying the containers. This worm conveyor is the only part of the regulated machine that is directly influenced by the forces delivered from the container accumulation and proportional to its length, and is chosen as the power transferring element.

The power vector effective in the axial direction to the infeed-worm is almost independent of the clearance between the container guide, container, and infeed-worm. This power changes proportionally and linearly in relation to the length of the accumulation, but its changes are neglectible for the control device with varying co-efficient of friction between containers and conveyor.

In order to transfer the power of the pressure head of the accumulated containers via the infeed-worm, the infeed-worm is movable in an axial direction. The friction resulting from a minimum axial moving of the infeed-worm is to be neglected because of constant revolution of the roller bearings during action of the machine.

When using this device, the distance between the various machines arranged one behind another may be relatively short, since the control takes place within each machine. The speed of a machine controlled by this device will quickly adapt to the corresponding accumulation thereby maintaining a certain container accumulation.

THE DRAWING

The drawing consists of one FIGURE which depicts a plan view of a worm conveyor and its mounting arrangement, partially broken away, as the worm conveyor transmits a pressure head to an index converter.

DETAILED DESCRIPTION OF THE PREFERRED EMBODIMENT

The FIGURE depicts means for supplying a steady flow of articles to the inlet conveyor 3 of an article-handling machine. The machine can be of any article-handling type in which it is desirable to maintain some degree of backlog or accumulation of articles to be treated in order to assure the continuous availability thereof. Preferably such a machine is of the container-handling type. For example, the machine can be of the type in which containers 1, such as bottles, are filled, closed, capsuled, and/or labeled.

The containers 1 are advanced by a supply conveyor, such as an endless belt conveyor 2A within a guide structure 2. The containers 1 are supplied by the conveyor belt 2A through the guide structure 2 to the driven infeed conveyor 3 which is preferably of the worm type.

The containers 1 are delivered onto the threads of the worm conveyor 3, as depicted in the FIGURE. The worm conveyor is then driven to suitably advance the containers toward the main part of the machine. In this fashion, the containers are spaced by a proper distance for machine introduction.

The containers 1 are generally supplied to the worm conveyor in sufficient quantities to assure the creation of an accumulation of containers at the intake end of the worm conveyor. In the event that the desired length of container accumulation cannot be maintained at the current speed of the container-treating machine, it is necessary that such a condition be sensed so that proper corrective signals can be sent to the machine drive to alter the rate of operation.

The present invention accomplishes this by taking advantage of the forces created by the accumulated containers. As will be apparent, as the total number of forwardly-urged containers which accumulate ahead of the worm conveyor 3 increases, the total axial force, or pressure head, imparted axially against the worm conveyor 3 will also increase. Similarly, a decrease in the total number of accumulated, forwardly-urged containers will produce a decrease of such pressure head. The worm conveyor 3 is operably connected to a speed control apparatus in a manner which enables pressure head conditions to be transmitted thereto, as will be subsequently described in detail.

The worm conveyor 3 is mounted so as to be translatable in an axial direction. A bearing support 5 fixedly connected to the machine is provided to rotatably but axially shiftable carry the worm conveyor 3 by cylindrical roller bearings 4 surrounding the shaft of the worm conveyor. A ball bearing 6 is supported at one end of the worm conveyor shaft to provide axial support.

An axially shiftable bearing arm 7 is fixedly connected to the outer ring of the ball bearing 6. Relative angular displacement between the bearing support 5 and the arm 7 is prevented by a guide-bolt 8 of the arm 7 that is disposed and axially shiftable in a guide bore 8A of the bearing support 5.

The arm 7 abuts against a resiliently biased speed control mechanism 9. The latter may be of any conventional type as e.g. a load cell and may include an index converter and signal comparison means suitable for comparing input and reference signals and generating corrective signals. The speed control mechanism is operably connected to a motor M which can be employed to drive the worm conveyor 3 and/or various other components of the container-treating machine. The speed control mechanism is connected to the motor M in such fashion as to be capable of increasing or decreasing the rate of operation thereof depending upon the sensed conditions relating to the size of the container backlog. The speed control mechanism includes a control element 9A which is biased outwardly so as to react against the bearing arm 7 and impose a bias thereagainst.

It will be apparent that axial displacement of the arm 7 will result in a shifting of the control element 9A. According to the amount of such shifting the speed control mechanism 9 will function accordingly to alter the speed of the motor M.

Axial displacement of the arm 7 is caused by axial shifting of the worm conveyor 3. For example, as the number of accumulated containers lessens, the axial force or pressure head being urged against the worm conveyor 3 will be reduced. The control element 9A will shift in a manner sensing the reduction in container accumulation. When a predetermined reduction in container accumulation is sensed, the speed control mechanism 9 will function to reduce the speed of the motor M and thereby slow-down machine operation until sufficient container accumulation is re-established.

In this manner, the power established by container accumulation against the infeed-worm 3 will be registered with the motor by means of the index converter. The power is converted to a signal by the index converter which delivers the corresponding signal to the signal comparison means which compares this effective signal with a theoretical value. The balance of the effective and desired values controls the signal supplied to regulate operation of the motor M until the container accumulation corresponds to the desired value. Consequently, the proper signal necessary for the regulation of the container-treating machine and the infeed-worm conveyor is produced in response to the corresponding length or magnitude of the container accumulation.

Note that by changing the bias of control element 9A, the size of the accumulation that is being maintained can be changed.

It should also be noted that in lieu of the conveyor 2A, any suitable arrangement can be provided that will result in the creation of a pressure head against the infeed conveyor in accordance with the size of a container backlog. For example, the line of approaching containers could include a vertically inclined section which would urge forwardly the horizontally positioned containers at the infeed conveyor. The pressure head thus created would be proportional to the number of inclined containers.

SUMMARY OF MAJOR ADVANTAGES

A major advantage of the present invention lies in the fact that the speed control mechanism is operated in response to the pressure head of accumulated articles, which pressure head is a function of the size of the backlog. Therefore, the number of factors which can interfere with proper readings and signals is minimized.

Through the present invention a generally constant article backlog is maintained by means of an accurate mechanism of relatively simplistic operation.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. An article handling mechanism comprising:
   a machine for treating individual articles, said machine including a driven infeed conveyor;
   said infeed conveyor being arranged for translational movement and having an inlet end for receiving articles and an outlet end for advancing said articles toward a treatment section of said machine;
   motor means for driving said machine;
   supply means for continuously supplying said articles to said inlet end of said infeed conveyor such that an accumulation of said articles at said infeed conveyor inlet end produces a pressure head against said infeed conveyor that is related in magnitude to the number of accumulated articles, said pressure head tending to urge said infeed conveyor for translational movement against an opposing bias; and
   speed control means for regulating the speed of said motor means;

said infeed conveyor including means for actuating a control element of said speed control means in accordance with translational movement of said infeed conveyor, to regulate the speed of said machine in accordance with the number of articles that have accumulated at said infeed conveyor inlet end in a manner maintaining a substantially constant number of articles accumulated.

2. Apparatus according to claim 1 wherein said infeed conveyor comprises a worm conveyor, bearing support means being provided for rotatably mounting said worm conveyor, said bearing support means being arranged to accommodate axial movement of said worm conveyor in response to said pressure head.

3. Apparatus according to claim 2 wherein said means for actuating a control element comprises a lever arm which abuts said control element.

* * * * *